United States Patent [19]

Sasaki

[11] 4,066,546

[45] Jan. 3, 1978

[54] CONTINUOUS FILTERING PROCESS AND AN APPARATUS THEREFOR

[75] Inventor: Jiro Sasaki, Nara, Japan

[73] Assignees: Toshin Science Co., Ltd.; Sekisui Kagaku Kogyo Kabushiki Kaisha, both of Osaka, Japan; part interest to each

[21] Appl. No.: 620,648

[22] Filed: Oct. 8, 1975

[30] Foreign Application Priority Data

Oct. 25, 1974 Japan .............................. 49-123840
May 28, 1975 Japan .............................. 50-64712

[51] Int. Cl.² ........................................... B01D 37/02
[52] U.S. Cl. ..................................... 210/75; 210/79; 210/81; 210/193; 210/195 R; 210/332
[58] Field of Search ....................... 210/77, 79, 81, 65, 210/70, 75, 297, 298, 327, 331, 334, 413–415, 502, 193, 195 R

[56] References Cited

U.S. PATENT DOCUMENTS

| | | | |
|---|---|---|---|
| 3,200,105 | 8/1965 | Barber et al. ..................... | 210/75 X |
| 3,437,208 | 4/1969 | Kaspar et al. .................... | 210/331 X |
| 3,477,575 | 11/1969 | Nemec et al. ..................... | 210/77 X |
| 3,502,575 | 3/1970 | Hepp et al. ...................... | 210/75 X |
| 3,606,016 | 9/1971 | Sasaki et al. ..................... | 210/65 |
| 3,648,844 | 3/1972 | Krynski et al. ................... | 210/331 X |
| 3,766,059 | 10/1973 | Sasaki ............................ | 210/332 X |
| 3,884,805 | 5/1975 | Bagdasarian et al. ............. | 210/75 X |
| 3,884,813 | 5/1975 | Donovan et al. ................... | 210/297 |

*Primary Examiner*—Frank W. Lutter
*Assistant Examiner*—Richard L. Chiesa

[57] ABSTRACT

A continuous filtering process and apparatus therefor in which a violent turbulence of fluid to be filtered is caused in a filter tank through which the fluid is continuously flowed. The turbulence is caused by rapidly rotating rotators which are arranged in the filter tank so that the surfaces of the rotators face the surfaces of filter media provided in hollow filter disks. A small interval such as three or five millimeters occurs between the rotators and the filter disks. Such violent turbulence of the fluid rapidly disperses concentrated fluid from the surfaces of the filter media so that the clogging of the filter media or the formation of a concentrated polarization layer is substantially prevented. Continuity of the filtering operation is therefore increased even when filter media having very fine perforations therethrough are employed.

3 Claims, 7 Drawing Figures

CONTINUOUS FILTERING PROCESS AND AN APPARATUS THEREFOR

This invention relates to a novel and improved continuous filtering process, and more particularly, to a continuous filtering process which permits a prolonged filtering operation even when a filter medium having very fine perforations therethrough is employed for a filtering purpose. The present invention also relates to a novel filtering apparatus suitable for carrying out such filtering process.

Japanese patent publication No. 17291/63, the invention of which was made by the inventor for the present application, discloses a continuous filtering process in which liquid to be filtered or slurry is flowed in a direction parallel to the surface of a filter medium so that the surface of the filter medium is always cleaned by such parallel flow of slurry or turbulency of flow caused on the surface of the filter medium resulting in removal of impurity particles or concentration polarization on such surface. Such removal of impurity particles or concentration polarization tending to cause clogging of the filter medium or prevention of a smooth filtration of the liquid permits a prolonged filtering operation. This idea that fluid to be filtered is flowed in a direction parallel to the surface of a filter medium is employed in so-called ultra-filtration and reverse osmosis filtration in each of which a filter medium or filter membrane having very fine perforations therethrough such as a filter membrane of a synthetic resin having perforations as fine as millimicron order is employed so that even very fine admixtures of millimicron order such as virus, bacteria, very fine dusts, colloidal particles or the like are removed or filtered out from fluid to be filtered. Although the mentioned idea employed in recently developed ultra-filtration and reverse osmosis filtration is effective to some extent, some difficulties are encountered. That is, filtration of a fluid through such filter medium having very fine perforations therethrough is easily interrupted or prevented by the clogging of the filter medium or by the formation of concentration polarization or concentration polarization layer on the surface of the filter medium which is caused for a short period of time of the filtering operation. Such clogging of the filter medium or such formation of concentration polarization layer becomes enhanced when pressure difference for filtration, namely difference between the pressures of fluid to be filtered and filtrate, is enlarged for enhancing filtering efficiency. And, such interruption or prevention of the filtering operation greatly reduces the continuity of a filtering operation, that results in a very poor filtering efficiency. Of course, such clogging of the filter medium or such formation of concentration polarization layer will cause a change of filtering accuracy with the lapse of time during a filtering operation. Further, so-called back-washing for regenerating a clogged filter medium having very fine perforations therethrough cannot be performed with ease especially when the medium is a membrane having a small thickness. It is to be noted that, when the flow rate of fluid to be filtered along the direction parallel to the surface of a filter medium is greatly enlarged for the purpose of enhancing the mentioned washing effect applied to the surface of the filter medium by such parallel direction flow, a very large power or energy is required for generating such flow of a very high rate, and even by such enlarged flow rate, the mentioned washing effect is not enhanced in practice to such an extent that the continuity of the filtering operation is greatly enlarged. From the foregoing, the ultra-filtration and reverse osmosis filtration have not been developed yet to such an extent that such filtrations can be applied to industrial purposes in an economical way.

In addition, U.S. Pat. No. 3,606,016 discloses a continuous filtering process in which liquid to be filtered is forcedly flowed in a direction parallel to the surface of a filter medium so that the liquid is moved together with impurity particles therein in a direction oblique to the surface of the filter medium with an angle determined by velocity component along such parallel direction due to such forcedly flowing of the liquid and velocity component perpendicular to the surface of the filter medium due to pressure difference for filtration, whereby even impurity particles having much smaller sizes than the sizes of perforations formed through the filter medium are removed or filtered out. In carrying out such filtering process which was developed by the inventor of the present invention, the mentioned washing effect for the surface of the filter medium is resulted so that such washing effect is usually taken into consideration in designing a practical filtering apparatus for carrying out such filtering process. However, in this case, too, the mentioned difficulties are encountered so that such washing effect cannot be achieved enough.

Accordingly, a primary object of the present invention is to provide a continuous filtering process which permits a prolonged filtering operation even when a filter medium having very fine perforations therethrough is employed for a filtering purpose.

Another object of the present invention is to provide a continuous filtering process which keeps filtering efficiency substantially unchanged for a long operation period of time.

Still another object of the present invention is to provide a continuous filtering process which may put the mentioned recently developed filter media or membranes into practical uses in an effective manner.

A further object of the present invention is to provide a continuous filtering apparatus which is very suitable for carrying out the continuous filtering process according to the present invention.

The present invention and its attendant advantages will become more readily apparent as the specification is considered in conjunction with the accompanying drawings in which.

Referring now to the drawings, there is shown a preferred embodiment of the continuous filtering apparatus according to the present invention in FIGS. 1 to 4. The filtering apparatus shown in FIGS. 1 to 4 comprises a filter tank 10 in which a plurality of filter disks 11 and a plurality of rotatable disks 12 are alternately arranged. The filter disks 11 are fixedly arranged in the filter tank 10 with equal intervals therebetween by supporting the same at the outer peripheries thereof, as will fully be detailed later. The rotatable disks 12 which are disposed between the filter disks 11 are fixedly mounted on a rotatable horizontal shaft 13 extending on and along the longitudinal axis of the tank 10 so that the rotatable disks 12 are driven to rotate when the shaft 13 rotates, as will also be detailed fully later.

Figure 2:
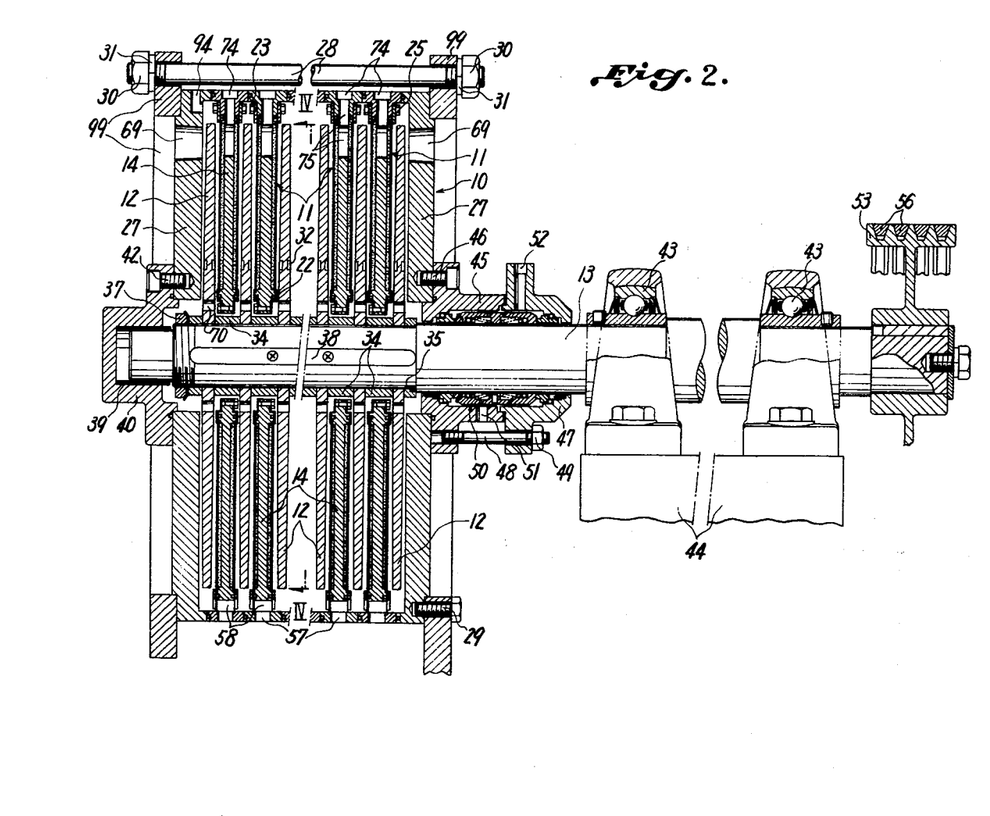
FIG. 2 is a vertical sectional view, partially cut away and partially omitted, of the filtering apparatus shown in FIG. 1.
Figure 3:
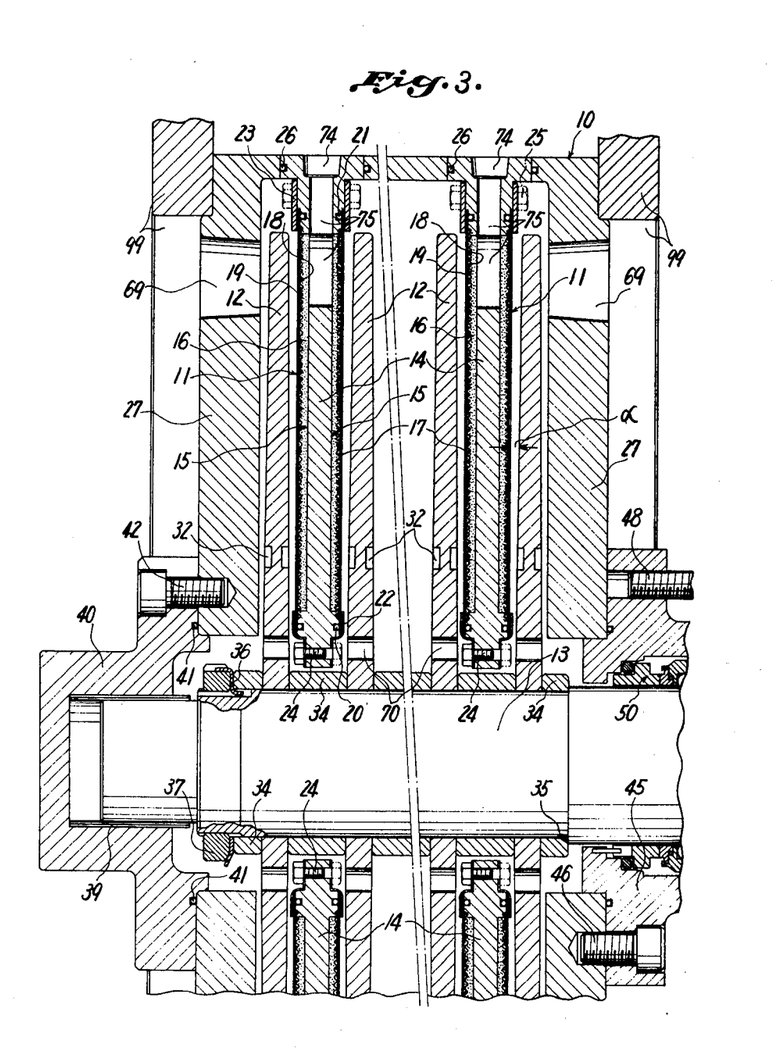
FIG. 3 is an enlarged vertical sectional view, partially cut away and partially omitted, of the filtering apparatus shown in FIG. 1.

As shown in FIGS. 2 and 3, each of the filter disks 11 comprises a ring-shaped support frame 14 through which the shaft 13 extends. The support frame 14 has at each surface thereof an annular recess 15 into which a porous packing material 16 of, by way of example, a thickly woven wirecloth, integrated wirecloths, particles of a synthetic resin which are jointed to one another by sintering, wire pieces of a metal or alloy which are jointed to one another by sintering or the like. On the packing material 16 through which filtrate may flow along radial directions is arranged a ring-shaped net 17 of a metal or alloy which is fixedly secured at inner and outer peripheries thereof to the support frame 14 by soldering or the like. On the net 17 is integrated an unwoven fabric 18 of a synthetic fibre on which in turn is integrated a filter membrane 19 of a polymer having fine perforations therethrough or another filter medium. The unwoven fabric 18 and filter membrane 19 which are integrated onto the surface of the support frame 14 at the inner and outer peripheral portions thereof through annular sealing rings 20 and 21 are tightened to the support frame 14 by means of inner and outer pressing rings 22 and 23 and inner and outer set bolts 24 and 25 intermittently arranged along the circumfential direction of the frame 14. A filter medium assembly or filter element composed of the net 17, unwoven cloth 18 and filter membrane 19 is thus fixedly provided to each surface of the filter disk 11. The support frame 14 is enlarged in thickness at the outermost end thereof and the support frames 14 of all of the filter disks 11 are engaged to one another at such outermost ends through sealing rings 26 so that the outermost ends of the support frames 14 constitute the peripheral wall of the filter tank 10. The side walls of the filter tank 10 are constituted by a pair of side plates 27 which are engaged to the support frames 14 of both side ends through sealing rings 26. The filter disks 11 or the support frames 14 thereof and the side plates 27 are tightened by tightening rods 28, which extend through machine frames 99 of both sides and which are arranged intermittently along the circumfential direction of the side plates, and tightening nuts 30 which are screwed onto the threaded ends of the rods 28 through washers 31.

Figure 4:
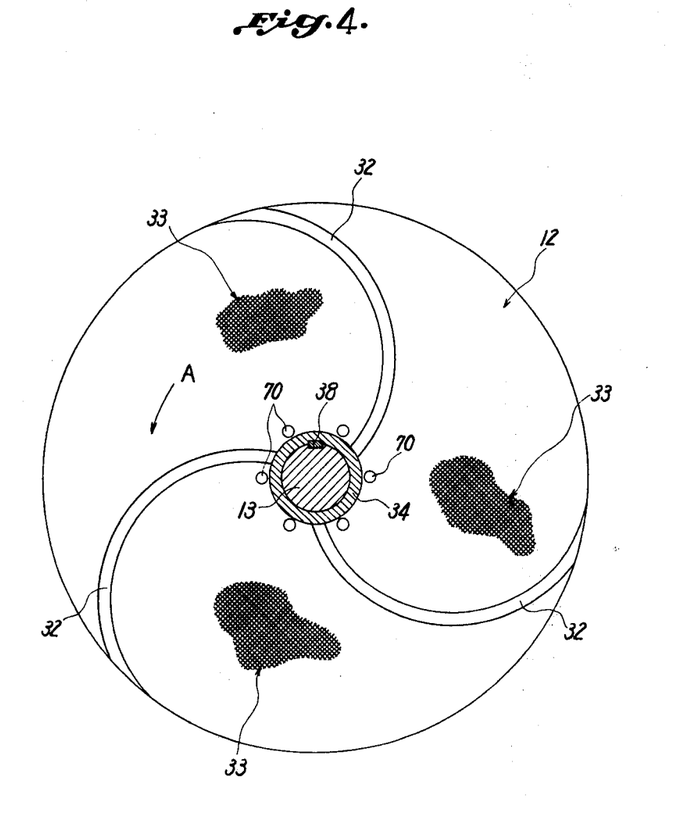
FIG. 4 is a vertical sectional view taken along line IV — IV of FIG. 2.

Each of the rotatable disks 12 is made of a metal, alloy, synthetic resin or the like. It is preferred that the surface of the rotatable disk 12 has an affinity with fluid to be filtered. The surface having such affinity may be provided by employing as material for the rotatable disk 12 or the surface covering thereof a synthetic resin having polar radicals which provide attractive force to the fluid or molecules of the fluid. As shown in FIGS. 3 and 4, the rotatable disk 12 is provided at each surface thereof a plurality of recesses 32 which extend approximately along the radial directions and which are concave toward the direction of rotation of the disk shown with arrow A in FIG. 4. As also shown in FIG. 4 by numeral 33, each surface of the rotatable disk 12 is made finely rugged by knurling or the like so that the surface has an area much larger than the apparent area of it. Further, as clearly shown in FIG. 3, the thickness of the rotatable disk 12 is gradually reduced toward the outer periphery thereof so that clearance $a$ between the surface of the filter disk 11 or filter membrane 19 thereof and the surface of the rotatable disk 12 is gradually increased toward the outer periphery of the disk 11 or 12. The mentioned clearance $a$ is about three millimeters at the innermost end of the filter membrane 19 and about four and a half millimeters at the outermost end of such membrane. The rotatable disks 12 are spaced from one another with equal intervals therebetween by spacer rings 34 on the shaft 13. The spacer ring 34 of one end is engaged to a step 35 on the shaft 13 and the spacer ring 34 of the other end is engaged through a washer means 36 to a tightening nut 37 which is screwed onto a threaded portion of the shaft 13. The rotatable disks 12 and the spacer rings 34 are mounted on the shaft 13 with the aid of a key 38 and are fixedly secured to the shaft 13 by the tightening nut 37.

One end of the rotatable shaft 13 is rotatably supported through plain bearing means 39 by an end housing 40 which is engaged to the side plate of such one end through a sealing ring 41 and is fixedly secured to such side plate 27 by set bolts 42 intermittently arranged along the circumfential direction of the housing 40. At outside the filter tank 10 the rotatable shaft 13 is rotatably supported by a pair of bearing means 43 fixedly mounted on a base frame 44. Immediately outside the filter tank is arranged another end housing composed of a housing member 45 fixedly secured to the side plate 27 of this end by means of intermittently arranged set bolts 46 and another housing member 47 fixedly secured to the former housing member 45 by means of intermittently arranged tightening rods 48 having threaded portions at both ends thereof and nuts 49 screwed onto the rods 48 at one ends of the rods. In the housing 45 and 47 is arranged a rotary sealing means or mechanical sealing means 50 which may be constructed in any known fashion so that the sealing means 50 permits the rotation of the shaft 13 while preventing the leakage of fluid from the filter tank 10. The end housing 45 and 47 is provided with an inlet 51 and an outlet 52 for flowing cooling medium or cooling water for the mechanical sealing means 50 through the housing. On the outermost end of the shaft 13 is fixedly mounted a pulley 53. Over this pulley 53 and a pulley 54 on the output shaft of an electric motor 55 arranged at outside the filter tank 10 are entrained belts 56 so that the shaft 13 is driven to rotate by the motor 55. The shaft 13 is driven to rotate with a speed such that the rotatable disks 12 are driven to rotate with a mean peripheral velocity of about 6 m/sec. The speed of rotation of the disks 12 is preferably selected so that the peripheral velocity of the innermost end of each disk 12 is larger than 3 m/sec.

Figure 1:
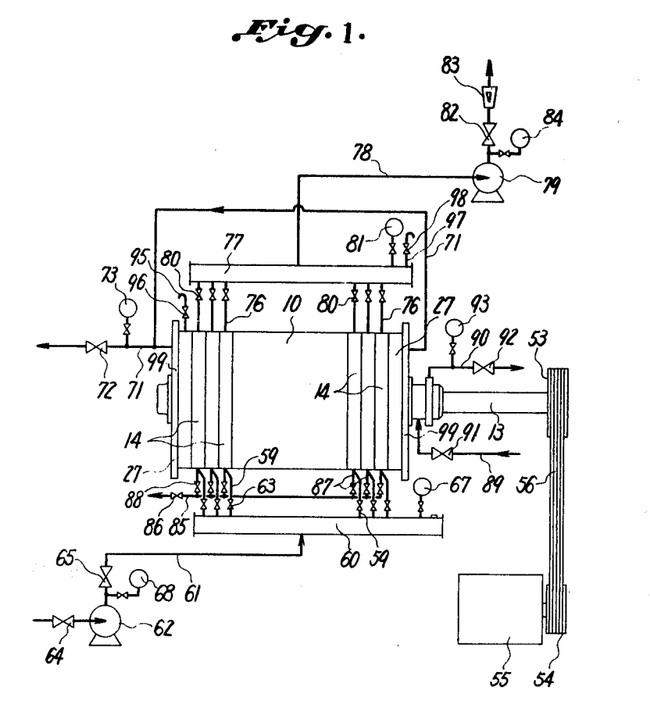
FIG. 1 is a schematic elevational view, partially omitted, of an embodiment of the continuous filtering apparatus according to the present invention.

Fluid to be filtered is supplied continuously into the filter tank 11 via fluid inlets 57 which are perforated through the outer periphery of the support frames 14 and which are communicated to perforations 58 perforated through and extending across the support frames 14 or filter disks 11, as shown in FIG. 2. As schematically shown in FIG. 1, all of the inlets 57 are connected through connecting pipes 59 to a common fluid distributor or distributing conduit 60 which in turn is connected to a fluid supply conduit 61 having a forced supply means 62. The supply means 62 is a pump in case when fluid to be filtered is a liquid and a blower or the like in case when such fluid is a gas. The supply means shown is illustrated as a pump. The connecting pipes 59 include valves 63 for opening and closing the pipes and the supply conduit 61 includes a control valve 64 and a valve 65 for opening and closing the conduit 61. Further, the distributor 60 and the supply conduit 61 include pressure gauges 67 and 68, respectively.

Concentrated fluid in the filter tank 10 is discharged or overflowed continuously out of the tank via fluid outlets 69 perforated through the side plates 27. For the aid of smooth flow of the fluid in the filter tank 10, each of the rotatable disks 12 is provided with a plurality of perforations 70 therethrough at a portion near the innermost end of the disk, as clearly shown in FIGS. 3 and 4. To the fluid outlets 69 is connected a discharge conduit 71 having a valve 72 for opening and closing the conduit 71 and a pressure gauge 73.

Purified fluid or filtrate having entered the inside of the filter disks 11 through the filter membranes 19 or filter elements 17 - 19 flows through the porous packings 16 toward the outer periphery of the filter disks at which periphery the filtrate is discharged out of the tank 10 through discharge outlets 74 provided to the support frames 14 therethrough at the outer periphery thereof, as shown in FIGS. 2 and 3. As clearly shown in FIG. 3, each of the support frames 14 is provided with a passage 75 which communicates the interior of the packings 16 of both sides to the discharge outlet 74. To the outlets 74 is connected through connecting pipes 76 a filtrate collector or collecting conduit 77 which in turn is connected to a filtrate discharge conduit 78, as shown in FIG. 1. The discharge conduit 78 includes a forced discharging means 79 which may be a pump for discharging purified liquid or a blower or the like for discharging purified gas. The discharging means 79 may be omitted because filtrate continuously entering the inside of the filter disks 12 may be discharged without the aid of such means 79. The connecting pipes 76 include valves 80 for opening and closing the pipes 76, the filtrate collector 77 include a pressure gauge 81 and the discharge conduit 78 includes a control valve 82, a flow meter 83 and a pressure gauge 84.

For discharging filtration-residue from the inside of the filter tank 10, there is connected further to the aforementioned fluid inlets 57 a discharge conduit 85 having a valve 86 for opening and closing such conduit 85 through connecting pipes 87 which include valves 88 for opening and closing such connecting pipes.

In addition, cooling medium for the mechanical sealing means 50 is flowed under pressure through the housing 45 and 47 and through pipes 89 and 90 connected to the aforementioned inlet 51 and outlet 52 for such cooling medium, as shown in FIG. 1. The pipe 89 includes a valve 91 for opening and closing the same, and the pipe 90 includes a valve 92 for opening and closing the same and a pressure gauge 93.

Furthermore, the peripheral wall of the filter tank 10 is provided therethrough with an air passage 94 shown in FIG. 2 to which passage is connected a breezing pipe 95 having a valve 96 for opening and closing such breezing pipe. A similar breezing pipe 97 having a valve 98 is also connected to the aforementioned filtrate collector 77. As clearly shown in FIG. 2, each of the aforementioned machine frames 99 has a ring-shaped top at which the frame 99 is secured to the side plate 27 by means of intermittently arranged set bolts 29.

The filtering process according to the present invention may be carried out by employing the filtering apparatus shown in FIGS. 1 to 4 as follows:

Fluid to be filtered such as waste water is supplied by the supply means 62 into the filter tank 10 under pressure, for example, of about 2 to 4 kg/cm². A part of this supplied fluid is continuously filtered through the filter membranes 19 into the filter disks 11 so that filtrate is continuously discharged through the discharge conduit 78, and the remainder of the supplied fluid is continuously discharged, after flowing through the filter tank 10 from the fluid inlets 57 toward the fluid outlets 69, through the discharge conduit 71. During such filtering operation the content of admixtures or impurity particles in the supplied fluid is enlarged at the surface of the filter elements or filter membranes 19 due to removal or separation of clean fluid from such supplied fluid at such surface by filtration, that may cause the formation of concentration polarization layer or the clogging of the filter membranes 19 so that filtering efficiency will rapidly be lowered to result in the interruption of the filtering operation. In the filtering apparatus shown in FIGS. 1 to 4, however, such troubles are avoided by the reasons that will be detailed hereinafter.

During the filtering operation, the rotatable disks 12 are forcedly rotated with the rotation of the shaft 13 which is driven to rotate by the motor 55. Due to such rotation of the rotatable disks 12 with a predetermined high speed of rotation of, for example, about 6 m/sec in mean peripheral velocity of the rotatable disks, the supplied fluid in the filter tank 10 tends to circulate toward the direction of rotation of the disks 12 because solid molecules constituting the surface portions of the rotatable disks 12 provide intermolecular attractive force to fluid molecules in the supplied fluid so that the fluid molecules tend to move together with the movement of the solid molecules. Such tendency of circulation of the supplied fluid is enhanced when the surface of each rotatable disk 12 is formed to have a very large surface area, as shown by numeral 33 in FIG. 4, and when the surface of such rotatable disk 12 is formed to have an affinity with the supplied fluid. On the other hand, such circulation or circulated flow of the supplied fluid is restrained by the filter disks 11 which are faced to the rotatable disks 12 with very small intervals α of, for example, 3 to 5 millimeters therebetween and which are always fixed in position. That is, solid molecules constituting the surface portion of the filter membranes 19 provide intermolecular attractive force to the fluid molecules in the supplied fluid which tends to restrain the fluid molecules from circulation. As a result of this, a violent turbulency of the supplied fluid is caused at the very small clearance between each adjacent filter disk 11 and rotatable disk 12 or on the surface of the filter disks 11. Such violent turbulency of the fluid causes a rapid dispersion of concentrated fluid and a rapid removal of adhered admixture or impurity particles from the surface of the filter membranes 19 so that formation of a concentrated polarization layer on the surface of the filter membranes is substantially prevented for a long period of filtering operation. Further, because concentrated fluid in the filter tank 10 is always discharged through the discharge conduit 71, fluid to be filtered existing in the filter tank 10 always has an approximately constant concentration and is not concentrated to an exceedingly large concentration. From the mentioned facts, filtration can be performed continuously for a long period of time with an approximately constant high efficiency.

During a filtering operation, centrifugal force or pressure which is directed toward the outer periphery of the rotatable disks 12 or filter disks 11 is applied to the supplied fluid in the filter tank 10 due to the mentioned circulation or circulated flow of such fluid which is caused by the rotation of the rotatable disks 12 with the predetermined high speed. Such centrifugal force or pressure may cause a non-uniformity of pressure applied to the filter elements or filter membranes 19 along the radial directions of the filter disks 11, that will cause a locally uneven filtration by such elements or membranes and even a damage of such elements or membranes. In the filtering apparatus shown, such centrifugal force or pressure is, however, eliminated, because the mentioned recesses 32 provided to the surfaces of the rotatable disks 12 will cause a centripetal force or pressure directed toward the inner periphery of the rotatable disks 12 along such recesses 32 in a manner similar to the impeller of a centrifugal pump so that the centrifugal force is approximately offset by such centripetal force. Pressure of the supplied fluid in the filter tank 10 is thus kept approximately uniform over the surfaces of the filter disks 11 along the radial directions of the filter disks so that an approximately uniform pressure is applied to the overall surfaces of the filter membranes 19, whereby a locally uneven filtration by the filter membranes 19 is avoided, that contributes toward an achievement of a locally even filtering accuracy and toward a prevention of damage of the filter elements or filter membranes 19 thereof.

Further, although the mentioned turbulency of the supplied fluid in the filter tank 10 may be larger at the outer peripheral portion of the rotatable disks 12 than at the inner peripheral portion of such disks because the peripheral velocity of the rotatable disks 12 is larger at the former portion than at the latter portion, such turbulency of the supplied fluid is approximately uniform all over the radial directions of the rotatable disks 12 because the interval or clearance $a$ between each adjacent filter disk 11 and rotatable disk 12 is gradually enlarged along the direction toward the outer periphery of the disk 12, as clearly shown in FIG. 3, so that turbulency of the fluid which is enhanced at the outer peripheral portion of the rotatable disk due to a larger peripheral velocity of the disk at such portion becomes moderated at such outer peripheral portion by such gradual enlargement of the interval $a$.

Purified fluid or filtrate is continuously discharged from within the filter disks 11 through the discharge conduit 78 under a controlled rate determined by the rotation of the pump or the like 79 and by the valve 82. The pump 79 is not necessarily required for such discharging of the filtrate, as already mentioned before.

After a filtering operation, filtration residue in the filter tank 10 may be discharged through the discharge conduit 85 by opening the valves 86 and 88 and also the valve 96 in the breezing pipe 95 and by closing the valves 63, 64, 65, 72 and 80.

A test was carried out by employing a test apparatus similar to the apparatus shown in FIGS. 1 to 4. Once treated city sewage from Toyonaka Sewage Treatment Plant, Toyonaka, Japan was filtered. Filter membranes of polyethylene having therethrough a number of perforations, the mean diameter of which is about 2 microns ($\mu$) at the surface of the membrane, manufactured by Sekisui Kagaku Kogyo Kabushiki Kaisha, Osaka, Japan were employed as the filter membranes 19. The total surface area of such filter membranes was about 1.1 m². Pressure of supplied waste water or sewage indicated by the pressure gauge 68 was about 3.1 kg/cm², pressure of discharged concentrated water indicated by the pressure gauge 73 was about 0.7 kg/cm², and pressure of filtrate indicated by the pressure gauge 84 was about 0.25 kg/cm². Flow rate of filtrate indicated by the flow meter 83 was about 4 liters/min. The mean peripheral velocity of the rotatable disks 12 was about 6 m/sec. About one tenth (1/10) of the charged waste water was continuously filtered.

Various determinations were made according to K0102-method and K0101-method of JIS (Japan Industrial Standard). The results of such determinations are listed in Table I.

Table I

|  | charged waste water (once treated city sewage) | filtrate |
| --- | --- | --- |
| chromaticity (degree) | 22 | 0 |
| order (TO) | 1.1 | 0 |
| pH | 7.1 | 7.4 |
| BOD (ppm) | 23.0 | 1.0 |
| COD (ppm) | 19.9 | 10.1 |
| SS (ppm) | 46.5 | 0.2 |
| $NH_4$-form nitrogen (ppm) | 22.0 | 22.0 |
| Cl-ion (ppm) | 54.1 | 52.6 |

It is seen that chromaticity, odor and SS (suspended solids) were greatly reduced. Although BOD(Biochemical Oxygen Demand), COD (Chemical Oxygen Demand), $NH_4$-form nitrogen and chlorine ion were not removed substantially, such contaminations may be removed by employing filter membranes having perforations much smaller than those of the filter membranes employed in the test.

It is to be noted that the filtering process according to the present invention may be carried out without interruption for a long period of time while keeping the filtering efficiency almost unchanged even when filter media or filter membranes having very fine perforations therethrough such as the filter membranes employed in the test are employed for the purpose of removal or separation of very fine contaminations from fluid to be filtered. Indeed, the mentioned test and another test have proved that a filtering operation by using the filtering apparatus according to the present invention can be carried out continuously for 1 to 3 days. Surprisingly, a reduction in the filtering efficiency due to the formation of concentrated polarization layer or the clogging of the filter media can be avoided so as to recover the filtering efficiency by enlarging the rotation speed of the rotatable disks 12 only for a short period of time, for example, for 10 minutes during a filtering operation, so that the mentioned turbulency of fluid to be filtered in the filter tank 10 is enhanced so much only for such short period of time. If such enlargement of the rotation speed by, for example, fifty percent is made under a condition that the pump 79 has been stopped and the valves 80 have been closed, the filtering efficiency is recovered in a shorter period of time of, for example, about one minute. So-called back-washing of the filter media which is usually carried out by flowing a clean fluid through such filter media along a direction reverse to that of filtration may thus be omitted. In addition, although it is considered that the mentioned turbulency of fluid to be filtered may be caused by forcedly rotating the filter disks 11 in place of the rotation of the rotatable disks 12, such rotation of the filter disks 12 the speed of which is required to be very high will cause damage to the filter elements and even a disassembling of the filter disks 12. This disadvantage is eliminated in the filtering apparatus according to the present invention because the filter disks 12 are fixed in position.

Figure 5:
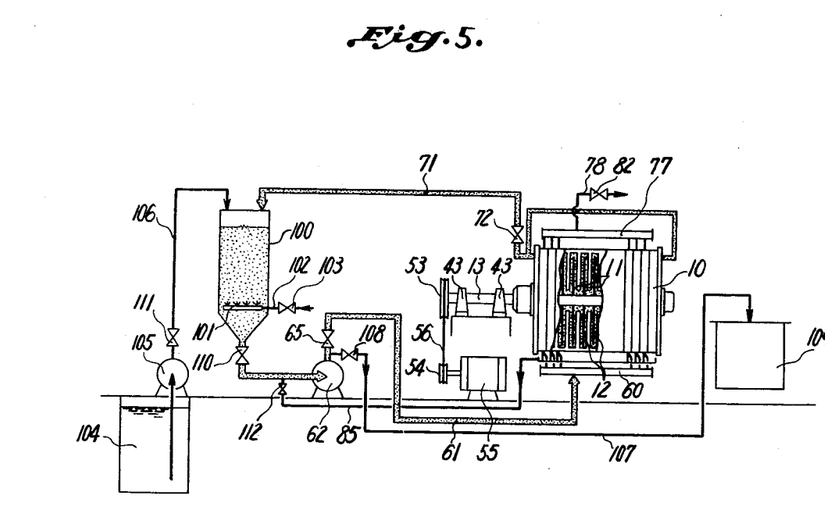
FIG. 5 is a schematic elevational view, partially cut away, showing a use of the filtering apparatus shown in FIGS. 1 to 4.

Referring now to FIG. 5, there is shown a preferred use of the filtering apparatus shown in FIGS. 1 to 4 for the purpose of filtering waste water or another contaminated liquid. The apparatus shown in FIG. 5 includes an agitation tank 100 which is arranged at outside the filter tank 10. The aforementioned discharged conduit 71 for concentrated fluid or liquid is connected to the agitation tank 100 at the top of the tank and the aforementioned supply conduit 61 for fluid or liquid to be filtered is connected to the agitation tank 100 at the bottom of the said tank so that liquid or slurry is recirculated through the filter tank 10 and agitation tank 100 via the conduits 71 and 61. Within the agitation tank 100 is arranged at the bottom portion thereof a plurality of air nozzles 101 which are connected to a source of compressed air such as a compressor (not shown) through an air supply conduit 102 having a valve 103 so that liquid in the tank 100 is agitated by the air jetted from the nozzle 101. Liquid to be filtered or slurry is continuously supplied to the agitation tank 100 or the recirculation system from a slurry tank 104 by a pump 105 through a supply conduit 106 with a rate substantially the same as the rate of discharging filtrate through the aforementioned filtrate discharge conduit 78 in which the aforementioned forced discharging means 79 is omitted. To the supply conduit 61 is connected after the pump 62 a filtration-residue discharge conduit 107 which has a valve 108 for connecting and disconnecting the discharge conduit 107 to the supply conduit 61. The filtration-residue discharge conduit 107 is communicated to a filtration-residue treating tank 109 which comprises a separator (not shown) for separating solid materials from filtration residue containing such solid materials and liquid such as centrifugal separator, sedimentation separator or the like and a regenerator (not shown) for regenerating active solid particles which will be explained later. The supply conduit 61 is provided with a valve 110 for opening and closing such conduit 61, the supply conduit 106 is provided with a control valve 111, and the discharge conduit 107 is provided with a valve 112 for opening and closing such conduit 107, as shown in FIG. 5.

Figure 6:
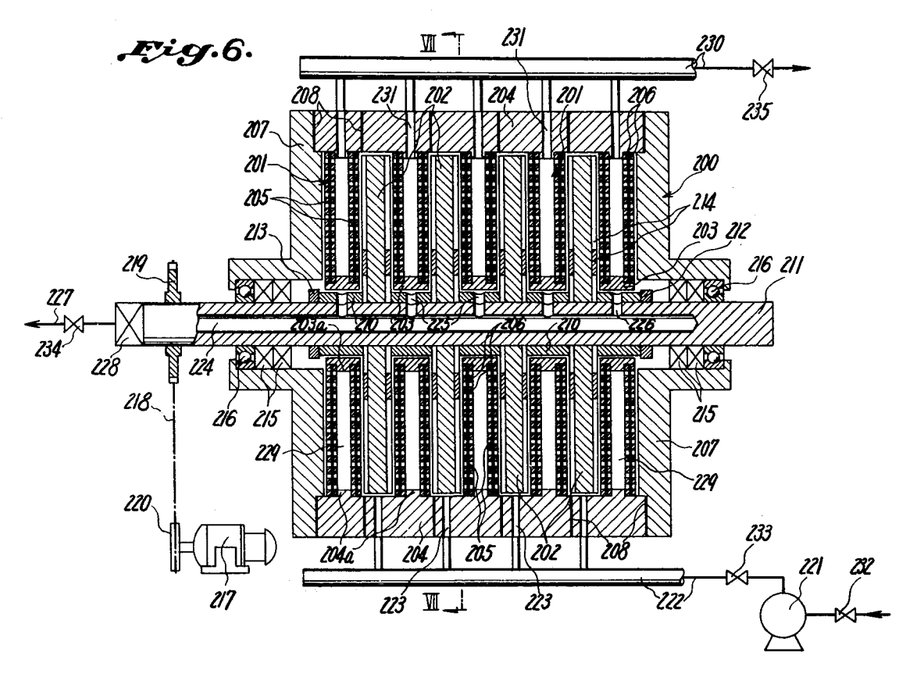
FIG. 6 is a schematic vertical sectional view of another embodiment of the continuous filtering apparatus according to the present invention.

In carrying out the filtering process according to the present invention by employing the filtering apparatus shown in FIG. 6, a predetermined amount of solid particles having active surface is admixed to the liquid which is recirculated through the filter tank 10 and agitation tank 100 via the conduits 71 and 61. The term "solid particles having active surface" means particles of a solid substance having an active surface which causes, when impurity particles in the liquid come into contact with such surface, the decrease of the content of free impurity particles by adsorbing or absorbing such impurity particles, by promoting a reaction such as oxidation or reduction so as to remove such impurity particles by decomposition, or by another function. Examples of such solid substances are activated carbon, ion-exchange resin, ferrous oxide, diatomaceous, metal peroxide such as nickel peroxide, clay mineral such as montmorillonite and the like. The size of such solid particles having active surface may be larger by 100 – 1000 times than that of impurity particles in the liquid to be filtered.

Such solid particles are added previously to the liquid, which is to be recirculated through the tanks 10 and 100, at the agitation tank 100 in an amount of about 5 to 15 wt.% of the liquid by taking into consideration impurity concentration in the liquid, amount of the liquid to be recirculated and the like. The flow rate of the recirculated liquid given by the recirculating pump 62 may be 15 – 25 times as large as the flow rate of filtrate which is discharged through the filtrate discharge conduit 78. The amount of the recirculated liquid and the flow rate of such recirculated liquid are pedetermined so that such recirculated liquid will pass through the agitation tank 100 in about 10 – 25 minutes.

As can now be understood, a predetermined amount of liquid to be filtered containing a predetermined amount of the mentioned solid particles having active surface is recirculated through the filter tank 10, the discharge conduit 71, the agitation tank 100 and the supply conduit 61. The mixture of the liquid and the solid particles having active surface may be called a fluidized bed. From such recirculated liquid filtrate is continuously extracted at within the filter tank 10, and fresh liquid to be filtered is supplemented into the recirculation path from the tank 104.

In the filter tank 10, the mentioned turbulency of the liquid at between the filter disks 11 and rotatable disks 12 prevents the formation of concentrated polarization layer or the clogging of the filter membranes 19 in the manner detailed before. In addition to this direct function of the mentioned turbulency of the liquid, such turbulency promotes the contact between the impurities or admixtures and the mentioned solid particles having active surface to cause a decrease of free impurities or admixtures so that such prevention of the formation of concentration polarization layer or the prevention of the clogging of the filter membranes 19 is further enhanced. In the agitation tank 100, the liquid having flowed into such tank 100 through the conduit 71 is agitated by the air jetted from the air nozzles 101. Due to such agitation and also due to a relatively long stay time of the liquid in the agitation tank 100, free impurities or admixtures in the liquid have a sufficient contact with the solid particles having active surface so that the content of such free impurities or admixtures is greatly reduced. The liquid supplied again into the filter tank 10 from the agitation tank 100 through the supply conduit 61 contains only a low concentration of such free impurities so that promotion of the clogging of the filter membranes 19 or the decrease of filtering efficiency due to an enlargement of concentration itself of such impurities in the liquid to be filtered.

When the activity of the mentioned solid particles having active surface has greatly been reduced, filtration residue consisting of the liquid to be filtered and consumed solid particles is discharged through the conduit 85 and through the conduit 107 into the treating tank 109 by closing the valves 65 and 72 and by opening the valves 108 and 112. In the treating tank 109, the consumed solid particles are separated from the liquid by a separator such as centrifugal separator and are regenerated by a regenerator such as steam regenerator which regenerates consumed activated carbon with overheated steam. Separated liquid may be returned into the tank 104 or may be treated by another process or may be abolished.

It is to be noted that the filtering apparatus shown in FIG. 5 greatly reduces the amount of filtration residue because the amount of filtration residue which is to be discharged into the treating tank 109 after a filtering operation is much smaller than the total amount of liquid which is continuously charged into the mentioned recirculation path through the conduit 106. Thus, an after-treatment of such filtration residue may be carried out with ease even when such aftertreatment is required. The treating tank 109 may, of course, be omitted when the filtration residue may be abolished as it is. Although the air nozzles 101 may be replaced by a mechanical agitator, such air nozzles are preferred when waste water or the like is to be treated by the present filtering apparatus because such air nozzles enrich dissolved oxygen in the water so that a propagation of anareobic microorganisms which may give a bad effect upon filtrate is prevented.

A test was carried out by employing a test apparatus similar to the apparatus shown in FIG. 5. The filter tank and accessories thereof of such test apparatus were the same as those of the test apparatus employed in the aforementioned test and were operated under a condition substantially same as that for the aforementioned test. Once treated waste water from an automotive industry was filtered. Activated carbon powder was employed as the mentioned solid particles having active surface and admixed with the waste water in an amount of about 10 wt.% of the water existing in the mentioned recirculation path. The means stay time of the waste water in the agitation tank was about 20 minutes.

The results of various determinations according to K0102-method and K0101-method of JIS are listed in the following Table II.

Table II

| | Waste water | filtrate |
|---|---|---|
| chromaticity (degree) | 44 | 0 |
| odor (TO) | 1.6 | 0 |
| pH | 6.6 | 7.4 |
| BOD (ppm) | 34.0 | 6.0 |
| COD (ppm) | 8.0 | 4.2 |
| SS (ppm) | 19.5 | 0.5 |
| $NH_4$-form nitrogen (ppm) | 0.3 | (not detected) |
| Cl-ion (ppm) | 40.2 | 41.2 |
| $SO_4$-ion (ppm) | 154.4 | 239.5 |

It is considered that the considerable decrease of BOD and COD was caused due to adsorption of organic contaminations in the waste water by the activated carbon. The increase of $SO_4$-ion was probably due to release of such ion from the activated carbon.

Figure 7:
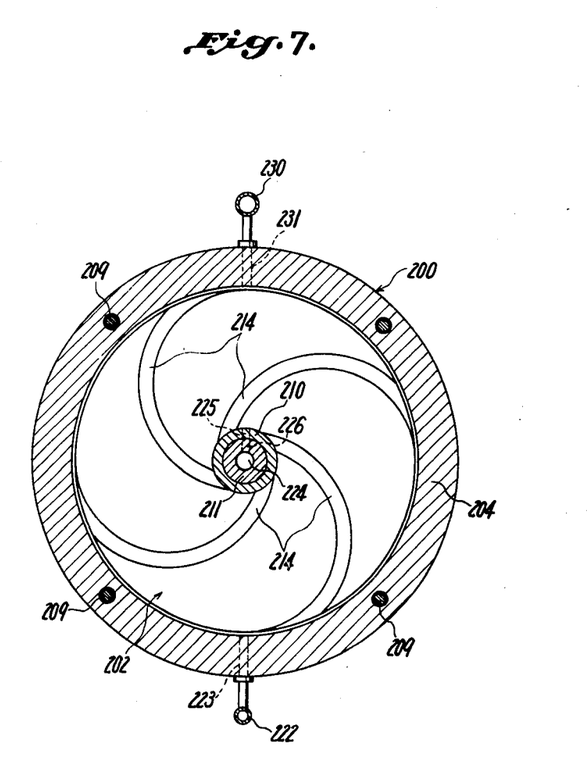
FIG. 7 is a vertical sectional view taken along line VII — VII of FIG. 6.

Turning to a consideration of FIGS. 6 and 7, there is shown another embodiment of the continuous filtering apparatus according to the present invention. The filtering apparatus shown in FIGS. 6 and 7 comprises a filter tank 200 in which a plurality of filter disks 201 and a plurality of rotatable disks 202 are alternately arranged with small intervals therebetween. Each of the filter disks 201 comprises an inner support ring 203, an outer support ring 204, and a pair of filter elements each of which is composed of a filter medium 205 and a pair of perforated plates 206 sandwiching the filter medium 205. The pair of filter elements are engaged to the inner and outer support rings 203 and 204 at inner and outer peripheral portions of the elements by utilizing annular projections 203$_a$ and 204$_a$ on the support rings and are fixedly secured to such support rings 203 and 204 by means of intermittently arranged bolts (not shown) or the like which secure the filter elements of both sides to the support rings at a same time. The filter tank 200 of this embodiment is constituted by a pair of side plates 207 and the outer support rings 204 each of which has a width larger than that of the inner support ring 204 and which are engaged to one another and to the side plates 207 through sealing rings 208 so as to form the peripheral wall of the tank 200. The support rings 204 and side plates 207 are tightened by a plurality of bolts 209 shown in FIG. 7.

The rotatable disks 202 are mounted with disposing spacer rings 210 therebetween on a rotatable horizontal shaft 211 extending through the filter tank and are secured to the shaft 211 by engaging the spacer ring 210 of one end to a fixed ring 212 on the shaft and by providing a tightening means 213 which is engaged to the spacer ring 210 of the other end. Each surface of the rotatable disk 202 is provided with a plurality of projections 214 which extend similarly to the recesses 32 on the rotatable disk 12 employed in the first embodiment shown in FIGS. 1 to 4, as shown in FIG. 7. Between the rotatable shaft 211 and the side plate 207 of each side are arranged rotary seal means 215 and bearing means 216. The shaft 211 is driven to rotate by an electric motor 217 through a chain 218 entrained over sprocket wheels 219 and 220 on the shaft 11 and output shaft of the motor so that the rotatable disks 202 on the shaft 211 are rotated with a predetermined speed of rotation.

Fluid to be filtered is supplied continuously into the filter tank 200 by a pump 221 or the like through a fluid supply conduit 222 which is connected to fluid inlets 223 perforated through the outer support rings 204 of the filter disks 201. Concentrated fluid is discharged continuously out of the filter tank through a fluid passage 224, which is perforated through and along the shaft 211 and which is communicated to the inside of the filter tank via perforations 225 and 226 formed through the spacer rings 210 and shaft 211, and through a fluid discharge conduit 227 which is connected to the shaft 211 through a rotary seal joint 228 so that the conduit 227 is communicated to the fluid passage 224. Filtrate having entered the hollow space 229 within the filter disks 201 through the filter elements by filtration is discharged continuously through a filtrate discharge conduit 230 which is connected to filtrate outlets 231 provided to and through the outer support frames 204 of the filter disks. In FIG. 6, numerals 232, 233, 234 and 235 designate valves provided to the aforementioned conduits 222, 227 and 230, respectively.

It is needless to say that the filtering apparatus shown in FIGS. 6 and 7 may be operated in a manner similar to that explained before in relation to the filtering apparatus shown in FIGS. 1 to 4. The projections 214 on the surface of the rotatable disks 202 play a function the same as that of the recesses 32 on the surface of the rotatable disks 12 employed in the filtering apparatus shown in FIGS. 1 to 4. Besides such function, the projections 214 forcedly provide to fluid in the filter tank 200 an agitation which promotes the turbulency of such fluid very much.

What is claimed is:
1. A continuous filtering process comprising the steps of:
   a. admixing fluid to be filtered with a predetermined amount of solid particles which can remove free impurities in the fluid by adsorption, absorption, promotion of a decomposition reaction or the like when the particles become in contact with such free impurities;
   b. permitting said solid particles to remove free impurities in the fluid by adsorption, absorption, promotion of decomposition or the like, c. continuously flowing the fluid to be filtered having been admixed with said solid particles through an inlet of a filter tank having therein
   i. a plurality of hollow filter disks fixedly arranged with equal intervals therebetween,
   ii. facing filter media supported on the filter disks, and
   iii. a plurality of rotators, each rotator being positioned between two adjacent filter disks with small clearances between the surfaces of the rotator and the surfaces of the filter media on the filter disks,
d. rotating the rotators continuously with a predetermined speed of rotation to cause a violent turbulence of the fluid to be filtered and thereby causing motion of the solid particles on the surfaces of the filter media, removing a layer of concentrated fluid from the surfaces of the filter media by said violent turbulence of the fluid and by motion of the solid particles, and achieving filtration through the filter media without substantial impurities adhering on the surfaces of the filter media;
e. continuously withdrawing filtrate from within the hollow filter disks;
f. continuously withdrawing fluid to be filtered from an outlet of the filter tank to an inlet end of an agitation tank having agitation means therein and agitating the fluid within the agitation tank,
g. supplying fresh fluid to be filtered to said inlet end of the agitation tank at a rate substantially equal to the rate of withdrawing said filtrate from the filter disks;
h. agitating the fluid in the agitation tank;
i. continuously withdrawing fluid from an outlet end of the agitation tank, the outlet end of the agitation tank being spaced from the inlet end to provide the fluid within the agitation tank with a stay time and agitation by means of the agitation means whereby the concentration of free impurities in the said fluid is lowered to a concentration that is substantially equal to the concentration of free impurities in the fresh fluid to be filtered; and
j. continuously supplying the fluid withdrawn from the outlet end of the agitation tank to the inlet of the filter tank.

2. A continuous filtering apparatus comprising:

a. a filter tank including a plurality of hollow filter disks fixedly arranged in the tank with equal intervals therebetween and with facing filter media supported on the filter disks, a plurality of rotators positioned between two adjacent filter disks with small clearances between the surfaces of the rotators and the surfaces of the filter media, fluid inlet means and fluid outlet means on the filter tank, and filtrate withdrawing means communicating with the hollow filter disks, said rotators causing a violent turbulency of the fluid to be filtered on the surfaces of the filter media when the rotators are rotated with a predetermined speed of rotation;
b. an agitation tank including therein agitation means for agitating fluid, first inlet means at one end of the agitation tank for concentrated fluid to be filtered, second inlet means for fresh fluid to be filtered, and outlet means at another end of the agitation tank for fluid to be filtered;
c. a first circulation path means connecting said fluid outlet means of said filter tank to said first inlet means of said agitation tank;
d. a fluid supply path means connected to said second inlet means of said agitation tank and including therein pump means for continuously supplying fresh fluid to be filtered to said agitation tank at a predetermined rate;
e. a second circulation path means connecting said outlet means of said agitation tank to said fluid inlet means of said filter tank and including therein pump means for continuously pumping fluid to be filtered from said agitation tank to said filter tank;
f. solid particle supply means connected to the circulation line formed by said filter tank, said first circulation path means, said agitation tank, and second circulation path means for supplying to said circulation line a predetermined amount of solid particles which can remove free impurities in the fluid to be filtered by adsorption, absorption, promotion of a decomposition reaction or the like; and
g. driving means operatively connected to said rotators in the filter tank for continuously rotating the rotators with said predetermined speed of rotation.

3. The continuous filtering apparatus of claim 2 in which said agitation means comprises an air nozzle for jetting compressed air into the agitation tank.

* * * * *